United States Patent [19]

Day et al.

[11] Patent Number: 4,538,265

[45] Date of Patent: Aug. 27, 1985

[54] METHOD AND APPARATUS FOR INSTRUCTION PARITY ERROR RECOVERY

[75] Inventors: Michael N. Day; Claude D. Miller, both of Austin, Tex.

[73] Assignee: International Business Machines Corporation, Armonk, N.Y.

[21] Appl. No.: 478,574

[22] Filed: Mar. 24, 1983

[51] Int. Cl.³ ............................................. G06F 11/16
[52] U.S. Cl. ......................................... 371/12; 371/5; 371/9
[58] Field of Search ................... 371/5, 7, 9, 12, 13

[56] References Cited

U.S. PATENT DOCUMENTS

| | | | |
|---|---|---|---|
| 3,345,614 | 10/1967 | Neel | 371/5 |
| 3,613,078 | 10/1971 | Manning et al. | 371/49 |
| 3,917,933 | 11/1975 | Scheuneman et al. | 371/5 |
| 3,988,714 | 10/1976 | Bardotti | 371/49 |
| 4,053,751 | 10/1977 | Ault | 371/5 X |
| 4,231,089 | 10/1980 | Lewine et al. | 371/12 X |
| 4,360,917 | 11/1982 | Sindelar et al. | 371/49 |
| 4,443,849 | 4/1984 | Ohwada | 371/12 X |

Primary Examiner—Jerry Smith
Assistant Examiner—Mark Ungerman
Attorney, Agent, or Firm—John W. Henderson, Jr.; Douglas H. Lefeve

[57] ABSTRACT

A method and apparatus for instruction parity error recovery in a programmable data processor wherein the instruction parity error is logged for future reference, the instruction causing the error is reloaded to memory and the program is restarted at the point of error. This method for "soft" recovery from an instruction parity error forces a No-Operation instruction onto the processor's instruction bus in place of the faulty instruction when a parity error is detected during instruction fetch, stores the address of the instruction having the parity error, and forces the next instruction to the processor from a parity error recovery routine. The parity error recovery routine logs the error, restores the instruction from local disk storage or from a remote host system in communication with the programmable data processor and forces the processor to resume fetching instructions at the address where the error occurred.

4 Claims, 3 Drawing Figures

METHOD AND APPARATUS FOR INSTRUCTION PARITY ERROR RECOVERY

TECHNICAL FIELD

This invention relates to bit error detection and recovery, and more particularly to the detection of bit errors in the instruction stream of a digital computer and recovery therefrom.

BACKGROUND ART

In many computer systems, and especially in small remote attached devices, internal instructions are read from storage in a sequence to control the operation of the processor. In the prior art, many of these remote devices contained only read-only storage (ROS) where the processor instructions were unalterably stored at the time of manufacture. When the instructions were read from the storage by the processor, a parity checker would determine if the instruction had good parity (contained the correct number of ones). If the parity was bad, these systems normally stopped the processor and set an indicator informing the operator of the device failure.

However, in many newer systems, various and different programs, sometimes large and complex, are executed in the remote devices, such as display workstations, allowing many different functions to be performed by the devices. Typically, the instructions for the remote device processor are loaded from either a local media, such as a diskette drive attached to the device, or from a remote host system, such as a large central processor, into a writeable random access memory (RAM) within the remote device. These RAM storage devices are generally affected by environmental conditions and have a higher failure rate than the ROS type of storage devices. Temporary or permanent device failures may occur more frequently due to bits being altered in the instruction storage by storage device failure or external environmental conditions. In prior art systems, this normally would result in the processor being halted and an indicator being set to inform the operator of the failure, resulting in loss of utilization of the device, loss of information being processed at the time of failure, and loss of operator time in reloading and restarting the device. When the device was remotely attached to a central host system, there was no automatic record made in the host system of the failure because, with an instruction error, the remote device's processor was stopped and communications with the host system was lost. This made the maintenance and problem isolation procedures for these remote devices very difficult since no record of instruction storage failure was sent to the host system.

DISCLOSURE OF THE INVENTION

Accordingly, one object of the present invention is to provide a method and apparatus for detecting parity errors in the instruction stream of an information processor and to recover the processor from the parity errors without operator intervention.

Another object of the present invention is to log, with the host system, a record of the occurrence of an instruction parity error in a remote processor system.

A further object of the present invention is to reload the instruction causing the parity error into the memory of the remote processor and to restart the remote processor at the address where the parity error occurred, thus preventing loss of processed information.

Another object of the present invention is to improve maintenance and problem isolation procedures in remote processor systems.

The foregoing and other objects are accomplished in accordance with the present invention by providing a recovery system for uncorrectable parity errors encountered by an information processor during instruction "fetch" from a RAM instruction storage device. An instruction parity checker presents a signal to the recovery system indicating that the instruction fetched from storage has an unrecoverable parity error. A No-Operation instruction is sent to the processor in place of the instruction with the unrecoverable parity error and the address of the faulty instruction is loaded into a register. The processor to instruction storage address bus is isolated from the instruction storage unit and a previously defined branch instruction to the error recovery routine is presented for the processor's next instruction fetch. The processor to instruction storage address bus is then reactivated to the storage unit and the processor begins executing the error recovery routine.

The error recovery routine saves the processor state and sends an error signal to the host system via the communication attachment. The error recovery routine reads the storage address of the failing instruction from the register, updates failure counters, and determines if this address has had a predetermined maximum number of sequential failures or if the storage unit has exceeded a predetermined maximum number of failures allowed. If the maximum number of failures has not been exceeded, the recovery routine sends the host system an instruction parity error indication, the address of the failure, and a reload indicator. The error recovery routine then links to the loader to reload the faulty instruction segment from the host system. After reloading the instruction segment, the processor's state is restored and the processor is branched back to the address it was executing from at the time of failure.

If the maximum number of failures has been exceeded, the error recovery routine sends the host system an instruction parity error indication, the address of the failure, and a retry exceeded indicator when the host system requests unit status. The error recovery routine then shuts down the communication link to the host system and sets a local indicator to inform the operator of an unrecoverable device error.

BEST MODE FOR CARRYING OUT THE INVENTION

Figure 1:
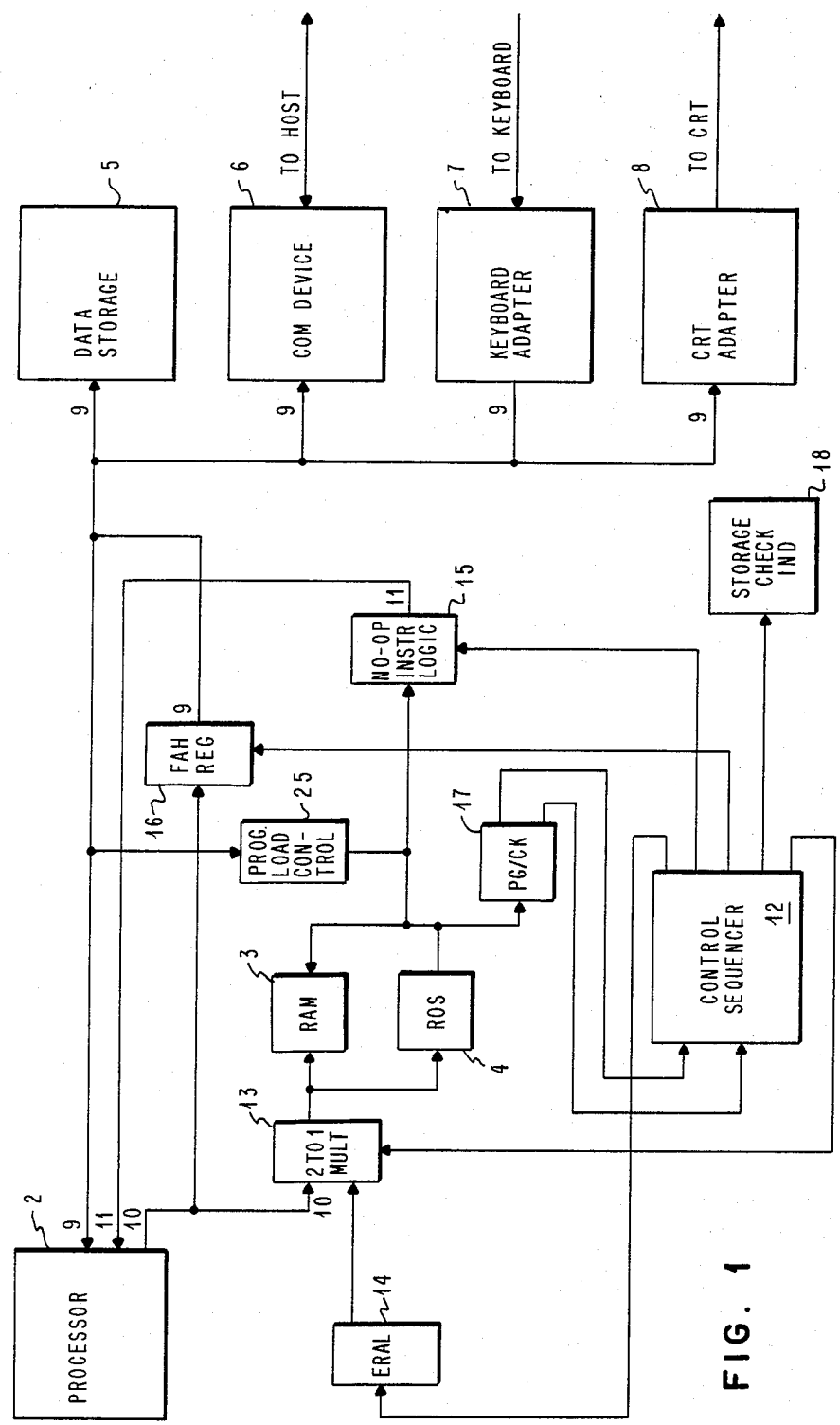
FIG. 1 is a block diagram of a computer system employing the present invention.

Referring to FIG. 1, a block-schematic diagram of a remote device processing system 1 that includes a processor 2 and instruction storage units 3 and 4 that incorporates the present invention is shown. Additionally, the remote device includes data storage 5, a communications device 6 to a host system, a keyboard adapter 7, and a CRT adapter 8 all of which are interconnected by a data bus 9. The program load control logic 25 allows the processor to read and write instructions to the writable instruction storage unit 3. The host system to which the remote device is connected by the communications device 6 may be any of the large or small so called mainframe computers having resident operating systems and capable of controlling a plurality of remote terminal devices, e.g., the IBM System 370 and the IBM 5520 Administrative System. The data bus 9 couples all addresses, data and control information between the processor 2, data storage 5, and the keyboard and CRT interfaces 7 and 8 respectively. An instruction address bus 10 and instruction data bus 11 couples instruction addresses, instruction data, and control information between the processor 2 and the instruction storages 3 and 4. An instruction parity generator/checker 17 creates partiy information for instructions being stored in the instruction storage unit 3 and checks the instruction parity when read by the processor 2 from storage units 3 and 4. It should be known and understood at this point that the device configuration in FIG. 1 is exemplary and that other configurations may be utilized which incorporate the present invention.

The instruction storage unit is typically Read Only Storage (ROS) in a remote device configuration to facilitate a set of instructions to provide power-on diagnostic procedures and a program loader to load the Writable Random Access Memory (RAM) unit 3 with the application program (set of instructions) from the host system. The Instruction Parity Error Recovery procedure, a part of the present invention, is incorporated in the (ROS) instruction storage unit 4. The additional component blocks which implement the present invention is the control sequencer 12 which controls the 2 to 1 instruction bus address multiplexor 13, the error recovery address logic 14, the No-Operation instruction logic 15, and the failure address holding register 16.

The control sequencer 12 receives two signals from the Instruction parity generator/checker 17. These control signals indicate whether a ROS storage 4 parity error or a RAM storage 3 parity error has occurred. If a ROS storage parity error is signalled the control sequencer 12 sets the storage check indicator 18 on the operator panel.

Figure 2:
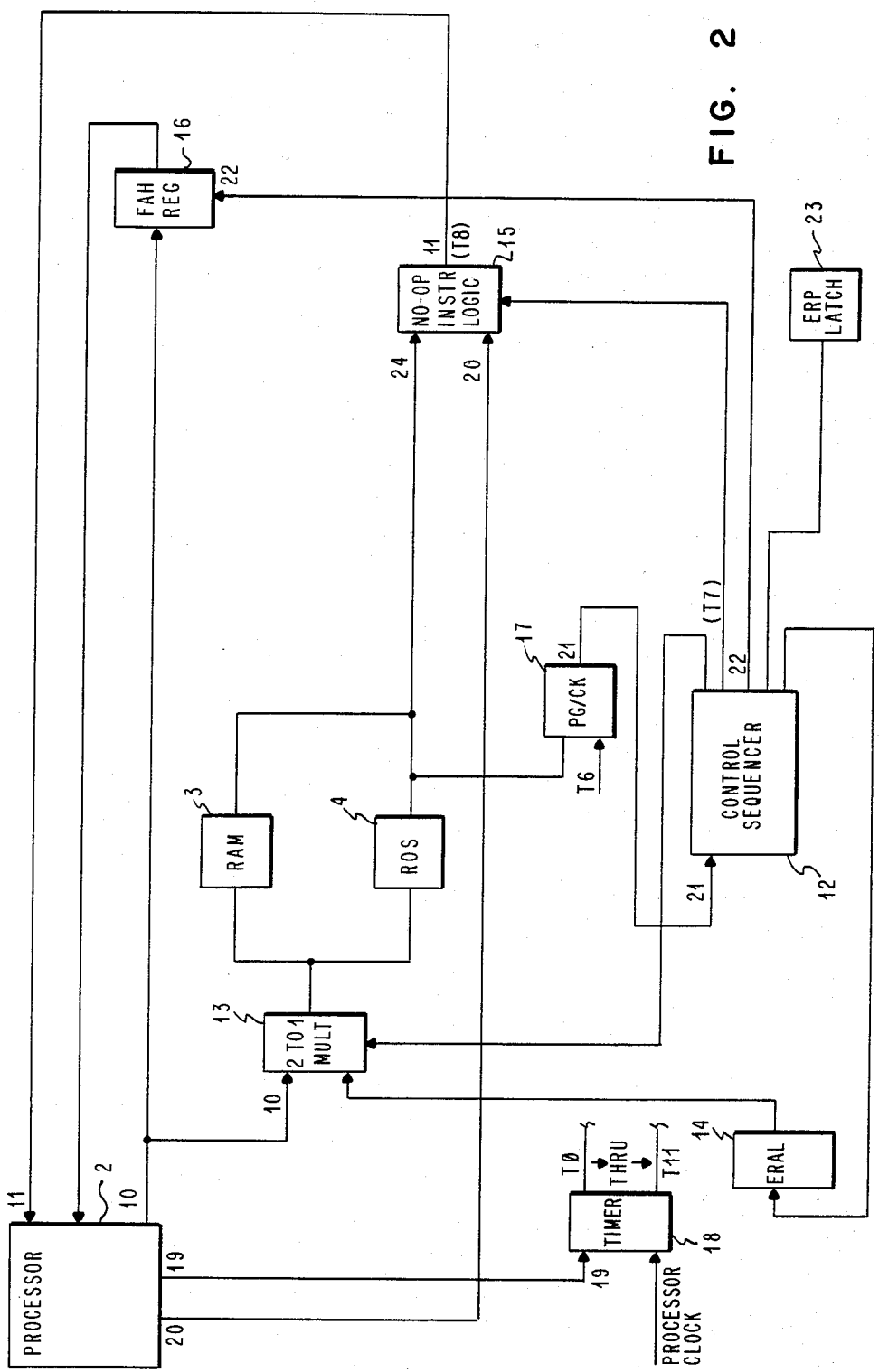
FIG. 2 shows in greater detail the inventive portion of FIG. 1.

Referring to FIG. 2 the processor 2 loads the instruction address onto the instruction address bus 10 and sets the instruction address valid signal 19. The timer 18 controls the memory cycle and is set to T0, starting the memory cycle on either the ROS storage unit 4 or RAM storage unit 3 depending on the address supplied by the instruction address bus 10. The timer 18 advances one T time each processor clock cycle. At T6 the data from storage is presented to the parity checker 17 from the storage data bus 24 and the parity is checked. At T8 the processor 2 presents the sample instruction bus signal 20 and loads the instruction from the instruction data bus 11 into the processor 2 for processing.

If the parity checker detects a RAM parity error, it sets the instruction RAM parity error signal 21 to the control sequencer 12. The control sequencer 12 activates the No-Operation instruction logic 15 which loads the instruction data bus 11 with the No-Operation instruction at T7 time. The control sequencer 12 then sets the load error address signal 22 to the failure address holding register 16 which causes the instruction address on the instruction address bus 10 to be loaded into the address register 16. The control sequencer 12 then sets an error recovery pending latch 23 and signals the 2 to 1 instruction address bus multiplexor 13 to select the error recovery address logic 14 for the next processor instruction fetch. The processor 2 processes the No-Operation instruction then sets the instruction address valid signal 19 to the storage units. The memory cycle reads an instruction from the address specified by the error recovery address logic 14. This address selects a branch to error recovery procedure instruction in ROS 4. This branch instruction is loaded onto the instruction data bus 11 and is read by the processor at T8 time. At T9 time the control sequencer 12 resets the error recovery pending latch 23 and resets the 2 to 1 instruction address bus multiplexor 14 to resume gating the processor's instruction address bus 10 to the storage units 3 and 4. The control sequencer 12 has now completed its parity error recovery cycle.

The error recovery routine, given processor control by the aforementioned error recovery logic, is detailed in the Program Design Language (PDL) description shown in Table 1. It should be known and understood that the error recovery routine described herein is exemplary and that modifications may be utilized to perform the function within the scope of the present invention. Functionally, the error recovery routine will be described with reference to FIG. 3.

TABLE 1

```
BEGIN PDL 010,010
  010    PAR_RECOV SUBROUTINE SEGMENT
  020    PCR_SAVE = PCR (Save Program Condition
         Codes In Save Area)
  030    REG1_SAVE = REG1 (Save Processor
         Registers)
  040    REG2_SAVE = REG2
  050    REG3_SAVE = REG3
  060    REG4_SAVE = REG4
  070    REG5_SAVE = REG5
  080    REG6_SAVE = REG6
  090    REG7_SAVE = REG7
  100    READ MODE_FLAG (from data storage)
  110    IF DIAGNOSTIC_IFETCH FLAG SET IN
         MODE_FLAG THEN
  120    DO (Diagnostic Test Return)
  130    READIO FAILURE_ADDRESS REGISTER
         PCR - PCR
  140    REG2 = REG2_SAVE (Restore Registers)
  150    REG3 = REG3_SAVE
  160    REG4 = REG4_SAVE
  170    REG5 = Exceeded - HARD_SAVE
  180    REG6 = REG6_SAVE
  190    REG7 = REG7_SAVE
  200    PCR = PCR_SAVE (Restore Condition
         Codes)
  210    GOTO DIAGNOSTIC IFETCH TEST RETURN
  220    ENDDO
  230    ELSE (Application Program Executing)
  240    DO
  250    INCREMENT STORAGE_FAILURE_COUNT
         (stored in Data Storage)
  260    READIO FAILURE_ADDRESS REGISTER
         INTO REG1
  270    READ LAST_FAILURE_ADDRESS INTO
         REG2 (stored in Data Storage)
  280    STORE REG1 INTO LAST_FAILURE_
         ADDRESS (stored in Data Storage)
  290    IF REG1 = REG2 THEN
  300    INCREMENT SAME_ADDRESS_COUNT
  310    ELSE
  320    CLEAR SAME_ADDRESS_COUNT
  330    ENDIF
  340    SET STATUS1 = INSTRUCTION_PARITY_
         ERROR (in Data Storage)
  350    IF STORAGE_FAILURE_COUNT =
         MAX_STORAGE_RETRY OR
         SAME_ADDRESS_COUNT =
         MAX_ADDRESS_RETRY THEN
  360    SET STATUS2 TO RETRY_EXCEEDED (in
         Data Storage)
```

TABLE 1-continued

| | |
|---|---|
| 370 | ELSE |
| 380 | SET STATUS2 TO RE_LOAD REQUEST (in Data Storage) |
| 390 | ENDIF |
| 400 | STATUS3 = REG1 (Failure Address) |
| 410 | CALL SET_ERROR_POLL (routine to signal Host System of Error) |
| 420 | CALL SEND STATUS (routine to send STATUS1-STATUS4 data to the Host System in response to a Read Status) |
| 430 | IF STATUS2 = RE_LOAD REQUEST THEN |
| 440 | DO (Reload program segment) |
| 450 | CALL PGM_LOADER (Routine to Accept Program Load commands and load Instructions received from the Host System into Instruction Storage) |
| 460 | REG1 = REG1_SAVE (Restore Registers) |
| 470 | REG2 = REG2_SAVE |
| 480 | REG3 = REG3_SAVE |
| 490 | REG4 = REG4_SAVE |
| 500 | REG5 = REG5_SAVE |
| 510 | REG6 = REG6_SAVE |
| 520 | REG7 = REG7_SAVE |
| 530 | PCR-PCR_SAVE (Restore Condition Codes) |
| 540 | GOTO APPLICATION PROGRAM (Using Address in Last_Failure_ Address Save Area) |
| 550 | ENDDO |
| 560 | ELSE (Retry Exceeded-HARD ERROR) |
| 570 | DO |
| 580 | CALL STOP_COMMUNICATIONS ROUTINE |
| 590 | SET STORAGE_CHECK OPERATOR INDICATOR |
| 600 | PROCESSOR HALT |
| 610 | ENDDO |
| 620 | ENDIF |
| 630 | ENDDO |
| 640 | ENDIF |
| 650 | ENDSEGMENT |
| ENDPDL | |

The parity error recovery routine starts in block 30 and in block 31 the processor condition or state at the occurrence of the error is saved in a plurality of predetermined storage locations. In block 32 the address of the instruction causing the parity error is read into register 1. In block 33 a test is conducted to determine whether the processor is in the diagnostic mode. If the processor is operating in the diagnostic mode then the error recovery routine branches to block 40 wherein the processor registers are restored with the processor state and the diagnostic routine is branched to in block 41. The operation of the diagnostic routine referred to in block 41 and the operation of the processor in a diagnostic mode is not directly related to the present invention and will not be discussed in further detail.

Figure 3:
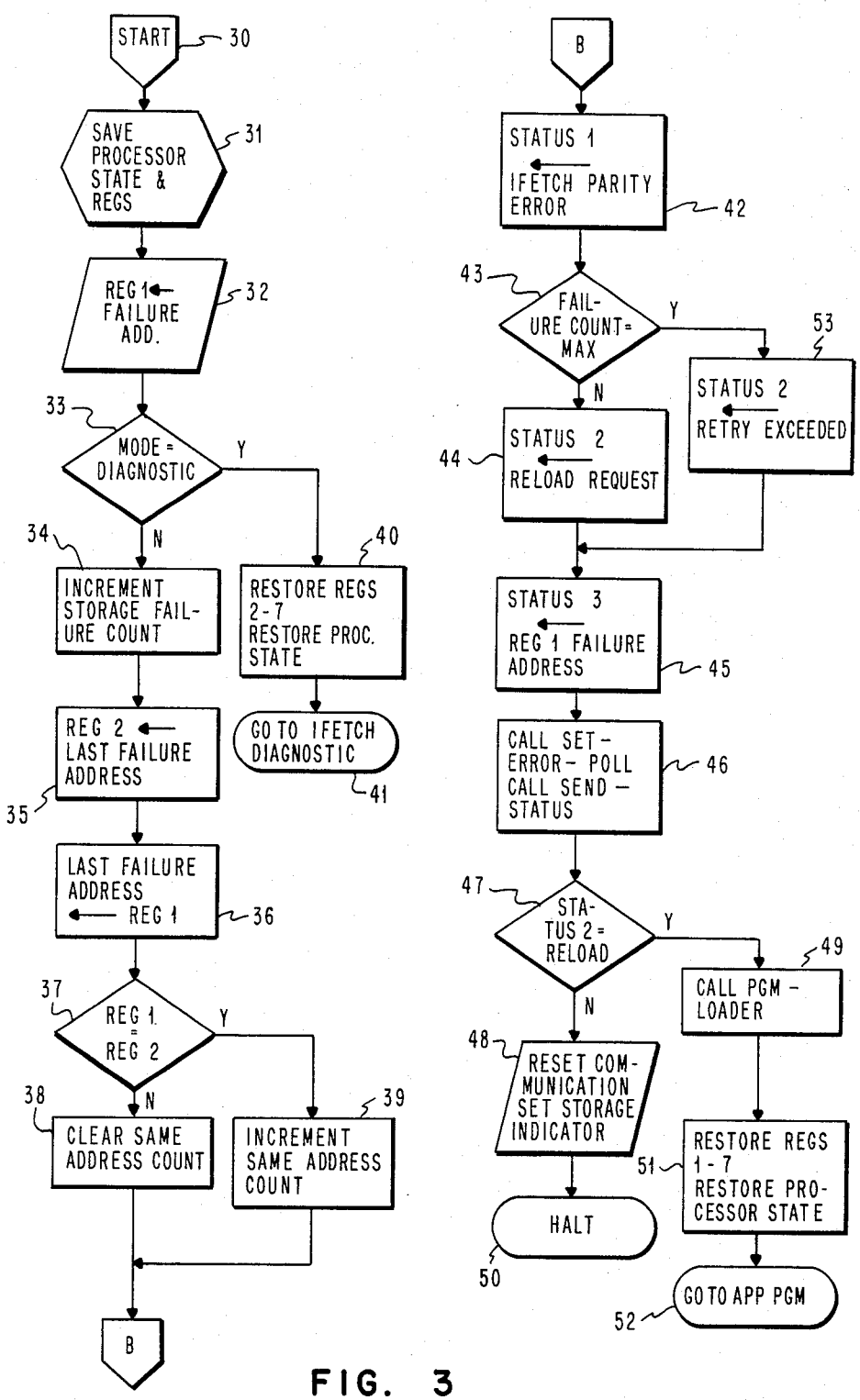
FIG. 3 shows a flow diagram of the operation of the parity error recovery routine of the present invention.

Referring back to block 33 of FIG. 3, if the processor is not in the diagnostic mode, then a parity error is assumed to have occurred during normal instruction fetch and processing continues in block 34 wherein a predefined storage location to keep track of the number of instruction parity errors occurring in the RAM memory is incremented by 1. In block 35 the address of the last instruction parity error is moved to working register 2. In block 36 the address of the current instruction parity error which was previously read into register 1 in block 32 is moved to the last failure address storage location. This places the current error instruction address in a position to become the address of the last instruction failure when the next failure occurs. In block 37 a test is conducted to determine if the address stored in register 1, which is the address of the current instruction having a parity error, is equal to the address stored in register 2 which is the address of the last instruction having a parity error. If the two addresses are the same, then a counter is incremented in block 31 to keep a cumulative count of the number of instruction parity errors occurring at the same address. If the address in register 1 is not equal to the address in register 2 then the same address counter is cleared at block 38.

Processing continues in block 42 wherein a storage location defined as status 1 is incremented to indicate that an instruction parity error has occurred in RAM storage unit 3. In block 43 status 1 and the same address counter are tested to determine whether each is equal to a predetermined maximum number of instruction parity errors allowed. This predetermined maximum number of parity errors allowable in the RAM storage unit 3 is purely a designer's choice used to establish a point at which the occurrence of errors in the RAM storage unit 3 is great enough to require replacement of the RAM storage. If the maximum allowable number of errors has occurred in either the current failing address or in the RAM storage unit 3, then status 2 is set in block 53 to indicate that the number of retries for the memory unit has been exceeded. If the failure counts are less than the maximum allowable, then in block 44 status 2 is set to request a reload from the host system of the instruction having the parity error.

Processing continues to block 45 wherein the current failing instruction address stored in register 1 is moved to the status 3 storage location. In block 44 an error indicator is set for the next poll to signal the host system that an instruction parity error has occurred in the remote system. The status information for the remote system is then accessed by the host system on its next poll of the remote system. In block 47 if status 2 was set to reload the error instruction in block 44, then the "program load routine" is branched to in block 49 to accept program load commands and load instructions from the host system to reload the instruction at the address defined in status 3. In block 51 the registers 1-7 are accessed to restore the processor's state and processing of the application program continues at block 52.

Referring back to block 47, if status 2 was set to indicate that the retry for the RAM storage unit 3 was exceeded in block 53 then processing continues to block 48 wherein the communication line to the host system is reset (disconnected) and an indicator is set on the remote system control panel to notify the operator that an uncorrectable storage error has occurred in the remote system. Processing is then halted in block 50.

The error poll signal and the status information which is sent to the host processing system in block 46 is recorded in the host processing system and may be later retrieved during routine preventative maintenance to provide information on errors occurring in the remote attached devices.

The present invention has been specifically described in the preferred embodiment as operating in a remote terminal system which is connected to a host processing system from which the application program instructions are offloaded to the remote system. However, it will be readily recognized by those having ordinary skill in the art that this error recovery routine is applicable to an information processing system wherein the application programs are stored on an external device such as a disk file and brought into the processor's instruction RAM memory only as needed. In this operating environment, the parity error recovery routine would initiate a reload of the error instruction from the external storage device to the system RAM memory.

This invention is not to be limited by the embodiment shown in the drawings and described in the description, which is given by way of example and not of limitation.

We claim:

1. A method for automatic instruction parity error recovery in a programmable remote terminal connected to a host information processing system comprising the steps of:
   (a) detecting the occurrence of a parity error during instruction fetch by the remote terminal processor;
   (b) gating a No-Operation instruction onto the processor's instruction bus to replace the instruction containing the parity error;
   (c) gating a branch instruction onto the processor's instruction bus for controlling the remote terminal processor to branch into an error recovery routine including utilizing said remote terminal processor to execute an error recovery program which comprises:
   (d) storing the address of the instruction containing the parity error;
   (e) logging the occurrence of the parity error to the host information processing system for recording;
   (f) issuing a request to the host processing system for the instruction containing the parity error;
   (g) reloading the instruction at the remote terminal processor memory address containing the parity error; and
   (h) gating the address of the instruction onto the remote terminal processor's instruction bus for controlling the remote terminal processor to resume processing at the address where the parity error occurred.

2. The method for instruction parity error recovery of claim 1 wherein step (d) further includes accumulating a count for the number of parity errors occurring at an instruction address, setting an indicator when the accumulated count equals a predetermined maximum, and halting operation of said information processor.

3. The method for instruction parity error recovery of claim 2 wherein step (d) further includes accumulating a count for the number of parity errors occurring in said main memory, setting an indicator when the accumulated count equals a predetermined maximum, and halting operation of said information processor.

4. The method for instruction parity error recovery of claim 1 wherein step (d) further includes accumulating a count for the number of parity errors occurring in said main memory, setting an indicator when the accumulated count equals a predetermined maximum, and halting operation of said information processor.

* * * * *

UNITED STATES PATENT AND TRADEMARK OFFICE
CERTIFICATE OF CORRECTION

PATENT NO. : 4,538,265
DATED : August 27, 1985
INVENTOR(S) : M. N. Day et al

It is certified that error appears in the above—identified patent and that said Letters Patent is hereby corrected as shown below:

Column 4, Line 42, "PCR - $PCR_{REG1}$" should read --INTO REG1--.

Column 4, Line 45, "Exceeded - HARD-$^{SAVE}$" should read --REG5 SAVE--.

Signed and Sealed this

Twenty-eighth Day of January 1986

[SEAL]

Attest:

DONALD J. QUIGG

Attesting Officer

Commissioner of Patents and Trademarks